UNITED STATES PATENT OFFICE.

HAROLD MELVILLE NEWTON, OF ST. LOUIS, MISSOURI, ASSIGNOR, BY MESNE ASSIGNMENTS, TO THE KETTLE RIVER COMPANY, A CORPORATION OF MINNESOTA.

PRESERVED WOOD.

1,037,832.   Specification of Letters Patent.   Patented Sept. 3, 1912.

No Drawing.   Application filed October 30, 1909.   Serial No. 525,562.

*To all whom it may concern:*

Be it known that I, HAROLD MELVILLE NEWTON, a citizen of the United States, residing in the city of St. Louis and State of Missouri, have invented a new and useful Composition of Matter—namely, a Wood-Preserving Compound—to be used for the preservation of wood, of which the following is a specification.

My composition consists of the following ingredients, combined in the manner here set forth, viz: creosote, distilled from tar sp. gr. 1.00 to 1.07. The hereinafter described tar, sp. gr. 1.10 to 1.16. These ingredients are thoroughly admixed in proportions which yield a resultant compound ranging in specific gravity from 1.07 to 1.14 as required by the character of the preservation work to be done. All the specific gravities herein stated are based upon a temperature of 15° C.

The tar which I use in my compound is derived from the destructive distillation of crude petroleum having an asphaltic base, and it occurs as a by-product of the well-known Lowe process of carbureting or enriching water gas with such petroleum. Asphaltic base petroleums are produced by many wells in Texas and California. This particular by-product tar or hydrocarbon oil, is black in reflected light and brown in transmitted light. Improper action or control of the gas making apparatus sometimes results in the formation of free carbon, which appears in the tar, but the tar is usually substantially free from matter or solids in suspension. This tar is, and remains, liquid at normal temperatures. It is but slightly volatile at atmospheric temperatures; a temperature somewhat exceeding 150° C. being required to initiate distillation. This oil, or tar, as obtained in commerce, may be readily distinguished from other water gas tars by gravity determination, its specific gravity being greater, varying between 1.10 and 1.16 at 15° C. My observation and experience prove that this heavy hydrocarbon oil or tar from such (the Lowe or equivalent) destructive distillation of petroleum oil characterized by an asphaltic base, is a compound of highly complex and stable order, its constituents belonging to the aromatic series. Its lighter constituents are antiseptic and are well fitted, in combination with the creosote oil, to preserve the saturated wood from fermentation or destruction by insects while its large proportion of bitumen insures the desirable, thorough water-proofing of the wood.

To secure the preserving compound having the desired specific gravity, $b$, which may for purposes of illustration be 1.08, I take $100-x$ parts of the hereinbefore described tar having a specific gravity $m$, this $m$ representing the actual specific gravity of the tar used in this particular case and lying within the limits 1.10—1.16 and may for purposes of illustration be 1.15, and thoroughly admix same with $x$ parts of commercial creosote oil distilled from tar, said creosote oil having a specific gravity $n$, which $n$ in turn represents the actual specific gravity of the distilled creosote used in this instance and lying within the limits 1.00—1.07 and may for purposes of illustration be 1.05. By a simple calculation I determine as follows the value of $x$, which is the percentage of distilled creosote oil in the compound formed:

$$m(100-x)+nx=100b$$

Substituting the known values of $m$, $n$, and $b$, $x$ becomes 70 and the compound is thus composed of 30 parts of the herinbefore described tar with 70 parts of distilled creosote oil.

One of the distinctly useful features of my wood preserving compound is that the percentage of bitumen or constituents which serve to seal and waterproof the wood may be greatly varied without changing the specific gravity of the resulting compound, as may be shown by again using the above illustration relative to the manner of producing compound of specific gravity 1.08. Should it be desirable to increase the waterproof qualities of the compound, as is often a desirable feature where the wood will be exposed to the influence and deteriorating effect of water, then I select a tar of the nature hereinbefore described having a lower specific gravity, say $m=1.11$, $100-x$ parts, and thoroughly admix same with $x$ parts of a lighter distilled creosote oil, of say specific gravity $n=1.01$. Determining the value of $x$, which is found to be 30, I obtain a compound composed of 70 parts of the hereinbefore described tar, 30 parts of distilled creosote oil, thus showing that the proportions may be actually reversed without changing the specific gravity of the resulting compound but nevertheless greatly varying the percentage of bitumens or waterproofing components or qualities of the resulting compound. The hereinbefore described tar always contains about 45 to 55% of bitumens, therefore in the first instance cited above the compound contains 15 to 17% of bitumens while when mixed in the manner last described it contains 31 to 38% of bitumen.

The wood impregnated with this compound is obviously a distinctly new article of manufacture; and even when placed in an environment that would occasion the quick destruction of ordinary wood will keep its form and strength for a great length of time.

My practice is to use the ordinary creosoting apparatus for forcibly impregnating wood with the hereindescribed compound; no special apparatus is required.

Wood impregnated with the hereindescribed tar is claimed in my companion application filed October 30, 1909, Serial Number 525,561.

Having thus described my invention I claim as new and desire to secure by Letters Patent:

1. As a new article of manufacture, wood impregnated with creosote oil admixed with the herein described residuum hydrocarbon oil obtained in the manufacture of oil and water gas, by use of petroleum oil having an asphaltic base, said hydrocarbon oil having a specific gravity of about 1.13 at 15° C., beginning to distil at about 150° C., being fluid at normal temperature and substantially non-volatile, practically free of matter in suspension and antiseptic to the organisms which attack wood.

2. As a new article of manufacture, wood substantially wholly impregnated with creosote oil mixed with the herein described residuum hydrocarbon oil obtained in the manufacture of oil and water gas, by use of petroleum oil having an asphaltic base, said hydrocarbon oil having a specific gravity of about 1.13 at 15° C., beginning to distil at about 150° C., being fluid at normal temperature and substantially non-volatile, practically free of matter in suspension and antiseptic to the organisms which attack wood.

In testimony whereof, I have hereunto set my hand, this 26th day of October, 1909, in the presence of two subscribing witnesses.

HAROLD MELVILLE NEWTON.

Witnesses:
M. SIMON,
R. L. FARRINGTON.